United States Patent
Stauffer et al.

(10) Patent No.: US 11,999,010 B1
(45) Date of Patent: Jun. 4, 2024

(54) ATTACHMENT OF POWDERED METAL TO POWDER FORGED OR WROUGHT MATERIALS

(71) Applicants: Peter Stauffer, St. Marys, PA (US); Barry Kline, Dubois, PA (US)

(72) Inventors: Peter Stauffer, St. Marys, PA (US); Barry Kline, Dubois, PA (US)

(73) Assignee: Keystone Powdered Metal Company, St. Marys, PA (US)

(*) Notice: Subject to any disclaimer, the term of this patent is extended or adjusted under 35 U.S.C. 154(b) by 565 days.

(21) Appl. No.: 17/167,603

(22) Filed: Feb. 4, 2021

Related U.S. Application Data

(60) Provisional application No. 62/970,954, filed on Feb. 6, 2020.

(51) Int. Cl.
*B23K 26/32* (2014.01)
*B23K 101/00* (2006.01)
*B23K 103/00* (2006.01)

(52) U.S. Cl.
CPC ........ *B23K 26/32* (2013.01); *B23K 2101/008* (2018.08); *B23K 2103/00* (2018.08)

(58) Field of Classification Search
CPC .............. B23K 26/32; B23K 2101/008; B23K 2103/00
USPC ..................................................... 219/121.64
See application file for complete search history.

(56) References Cited

U.S. PATENT DOCUMENTS 10,603,732 B2 * 3/2020 Hirono ..................... B23K 1/19

OTHER PUBLICATIONS

J.F. Hinrichs, P.W. Ramsey and M.W. Zimmermann, Joining sintered steel to wrought steel using various welding processes, Jun. 1971 (Year: 1971).*

* cited by examiner

*Primary Examiner* — Dana Ross
*Assistant Examiner* — James F Sims, III
(74) *Attorney, Agent, or Firm* — Alvin T. Rockhill

(57) ABSTRACT

This invention relates to a method for manufacturing a metal part which comprises attaching a powder forged or wrought outer raced ID splined plate to a powdered metal inner splined connection gear, wherein the outer raced ID splined plate incorporates a female ID profile on the race, wherein the inner splined connection gear contains a mail OD profile on the exterior of the part, and wherein the splined plate and the splined connection gear are attached together by (1) sinter brazing, (2) laser brazing, (3) laser welding, (4) sintering a mechanical joint, or (5) staking. In practicing this method a tight mechanical joint is formed between the splined plate and the splined connection gear which can be made of highly dissimilar materials, such as a wrought metal and a sintered powder metal.

9 Claims, 3 Drawing Sheets

ATTACHMENT OF POWDERED METAL TO POWDER FORGED OR WROUGHT MATERIALS

This application claims the benefit of U.S. Provisional Patent Application Ser. No. 62/970,954, filed on Feb. 6, 2020. The teachings of U.S. Provisional Patent Application Ser. No. 62/970,954 are incorporated by reference herein in their entirety.

BACKGROUND OF THE INVENTION

Powder metal parts are made by first compacting a metal powder composition into a desired shape in a die to produce a green metal part. The green metal part is then sintered at an elevated temperature to produce the powder metal part. Powder metal parts offer the advantage of being able to be formed into parts having intricate designs that frequently cannot be made by casting, forging or machining. In high volume applications, powder metal parts can typically be made at a reduced cost as compared to parts of similar design wherein machining is required. Accordingly, for economic and practical reasons, powdered metal parts are commonly used in a wide variety of applications.

There is a continuing demand for a wide variety of powder metal parts which are stronger, more durable, and can meet more and more stringent performance requirements. For instance, there is a need for powder metal toroids of all types, such as gears, bearing races, and one-way clutches which are stronger and more durable to provide a prolonged service life without failure and without compromising part tolerances and uniformity. There is also, of course, the ever present desire to produce such high performance parts without increasing costs and preferably at a reduced cost.

SUMMARY OF THE INVENTION

The present invention relates to a low cost technique for manufacturing parts of a generally toroidal shape, such as gears, bearing races, and one-way clutches, utilizing relatively low cost powder metal technology. The parts made employing this technology are strong, durable, and are capable of meeting stringent performance requirements without compromising tolerances or uniformity. By utilizing the technique of this invention parts can be made utilizing powder metal technology which could previously only be made via labor intensive machining procedures and in some cases which could not be manufactured on a commercial basis at all.

This invention provides a method for manufacturing a metal part which comprises attaching a powder forged or wrought outer raced ID (inside diameter) splined plate to a powdered metal inner splined connection gear, wherein the outer raced ID splined plate incorporates a female ID profile on the race, wherein the inner splined connection gear contains a mail OD (outside diameter) profile on the exterior of the part having approximately the same dimensions as those of the outer race, and wherein the splined plate and the splined connection gear are attached together by (1) sinter brazing, (2) laser brazing, (3) laser welding, (4) sintering a mechanical joint, or (5) staking. In practicing this method a tight mechanical joint is formed between the splined plate and the splined connection gear which can be made of highly dissimilar materials, such as a wrought metal and a sintered powder metal.

Practicing the method of this invention provides the capability of manufacturing superior products to those made utilizing a one-piece design. This is because it allows for the incorporation of full density metal only where it is required (on the OD) and allows for a lower density metal component to be incorporated into the part where high strength is not required. This approach can result in significant cost savings without compromising the performance characteristics or durability of the part. Practicing this invention offers the significant advantage of having the ability to use two different material systems with each being tailored each to be most the most cost effective overall solution. In addition to this a performance improvement is realized by precision machining the forged component before assembly which allows for superior tolerances to be achieved. For example, in wrought machining, the component generally needs to be pot broached and the heat treatment can cause distortion which leads to a part component of poor tolerance.

This invention more specifically discloses a metal part which is comprised of an external component and an internal component, wherein the external component has an external profile which includes a female inside diameter profile, and wherein the internal component has an internal profile which includes a male outside diameter profile, wherein the external component is comprised of a forged powder metal or a wrought metal and wherein the internal component is comprised of a sintered powder, wherein the male outside diameter profile of the internal component is positioned within the female inside diameter profile of the external component, and wherein the external component and the internal component are affixed together by a sinter braze, a laser braze, a laser weld, a stake, or a sintered mechanical joint.

The subject invention further reveals a method of manufacturing a metal part which comprises (1) providing an external component and an internal component, wherein the external component has an external profile which includes a female inside diameter profile, and wherein the internal component has an internal profile which includes a male outside diameter profile, wherein the external component is comprised of a forged powder metal or a wrought metal and wherein the internal component is comprised of a sintered powder; (2) positioning the male outside diameter profile of the internal component within the female inside diameter profile of the external component; and (3) affixing the external component and the internal component together by sinter brazing, laser brazing, laser welding, staking, or sintering a mechanical joint.

Figure 1:
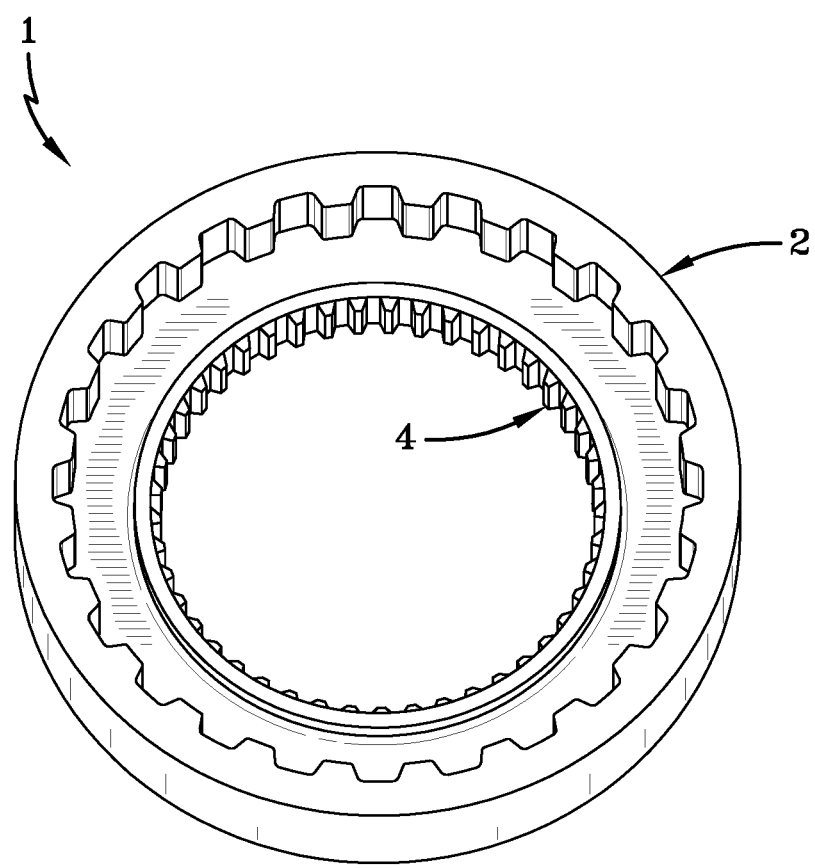
FIG. 1 illustrates toroidal part which can be manufactured in accordance with the technique of this invention and which is comprised of an outer component and an inner component. This part is comprised of a powder forged or wrought outer raced inside diameter (ID) splined plate and a sintered powdered metal inner splined connection gear, wherein the outer raced ID splined plate has a female ID profile on the race, wherein the inner splined connection gear contains a male OD profile on the exterior of the part having approximately the same dimensions as those of the outer race

It should be understood that various aspects of the invention are presented in FIGS. 1-8 which may not be drawn to scale and which is not intended to be limiting with respect to the scope of the invention now being claimed. In most cases, like components which are illustrated in the drawings are numbered using like reference numerals.

DETAILED DESCRIPTION OF THE INVENTION

FIG. 1 illustrates a toroidal part which can be manufactured in accordance with the technique of this invention and which is comprised of an outer component and an inner component. This part is comprised of a powder forged or wrought outer raced inside diameter (ID) splined plate and a sintered powdered metal inner splined connection gear, wherein the outer raced ID splined plate has a female ID profile on the race, wherein the inner splined connection gear contains a mail OD profile on the exterior of the part having approximately the same dimensions as those of the outer race.

The present invention will now be described in terms of the method which it employs in manufacturing high strength, durable toroidal parts, such as gears, bearing races, one-way clutches, and the like. It should be understood that FIGS. 1-8 and the descriptions of the present invention provided herein have been simplified to illustrate elements that are relevant for a clear understanding of the present invention, while eliminating, for purposes of clarity, other elements and/or descriptions that are well-known to those skilled in the art. Those of ordinary skill in the art will recognize that other elements may be desirable in order to implement the present invention. However, because such elements are well known in the art, and because they do not facilitate a better understanding of the present invention, a discussion of such elements is not provided herein.

Figure 2:
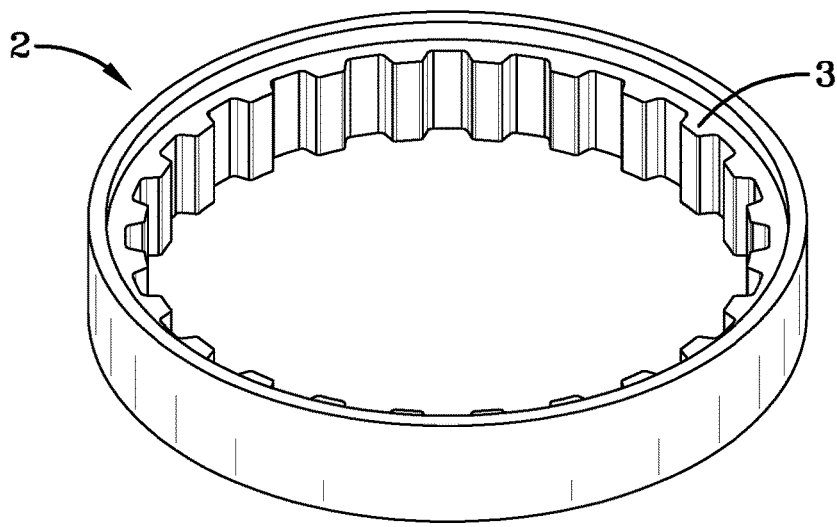
FIG. 2 is a top perspective view of the outer race of the part shown in FIG. 1.
Figure 3:
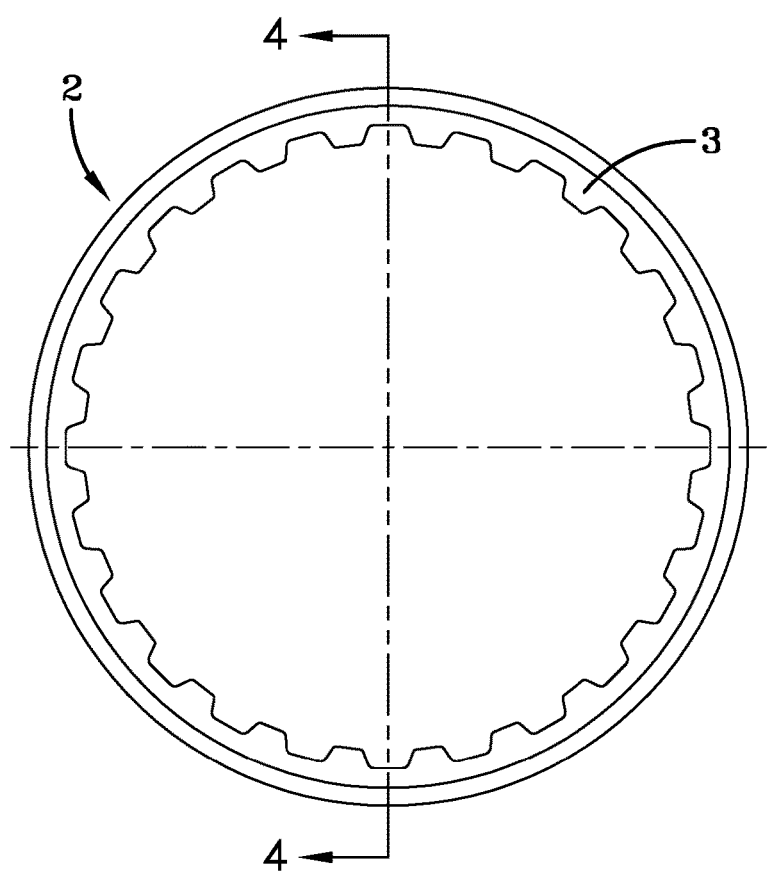
FIG. 3 is a top view of the outer race (splined plate) shown in FIG. 2.
Figure 4:
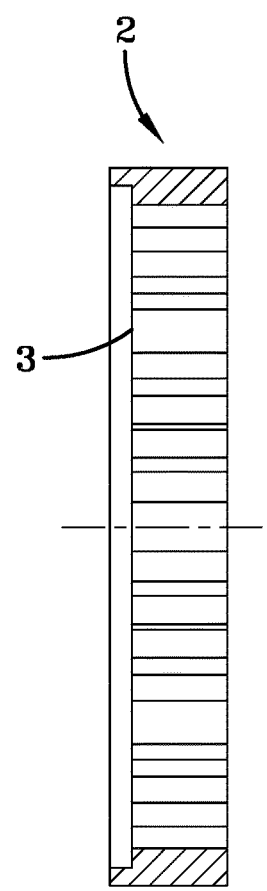
FIG. 4 is a cross-sectional view taken along section line A-A of the splined plate shown in FIG. 3.
Figure 5:
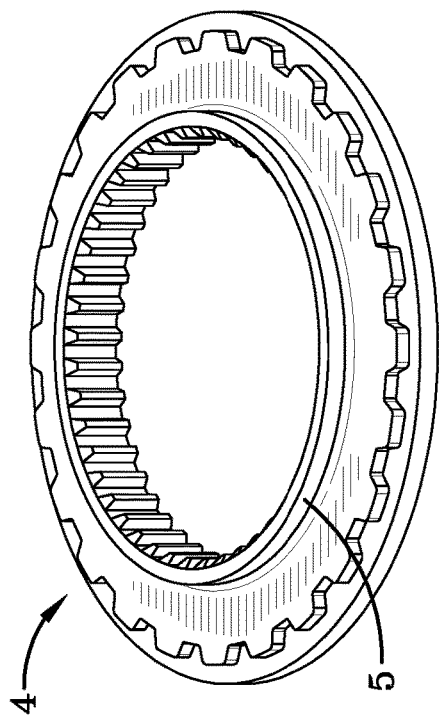
FIG. 5 is a top perspective view of the sintered powdered metal inner splined connection gear of the part shown in FIG. 1.
Figure 6:
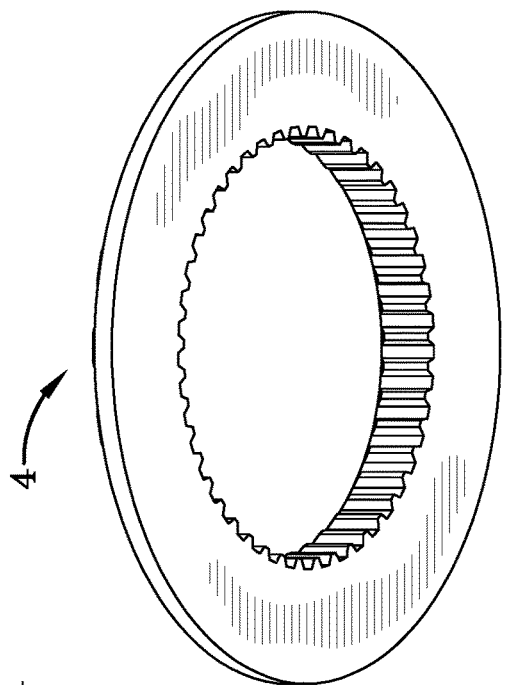
FIG. 6 is a bottom perspective view of the sintered powdered metal inner splined connection gear of the part shown in FIG. 1.
Figure 8:
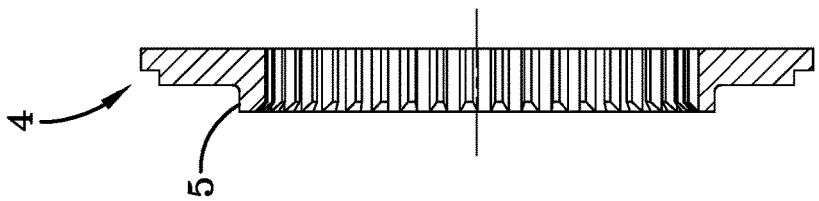
FIG. 8 is a cross-sectional view taken along section line A-A of the sintered powdered metal inner splined connection gear shown in FIG. 7.
Figure 7:
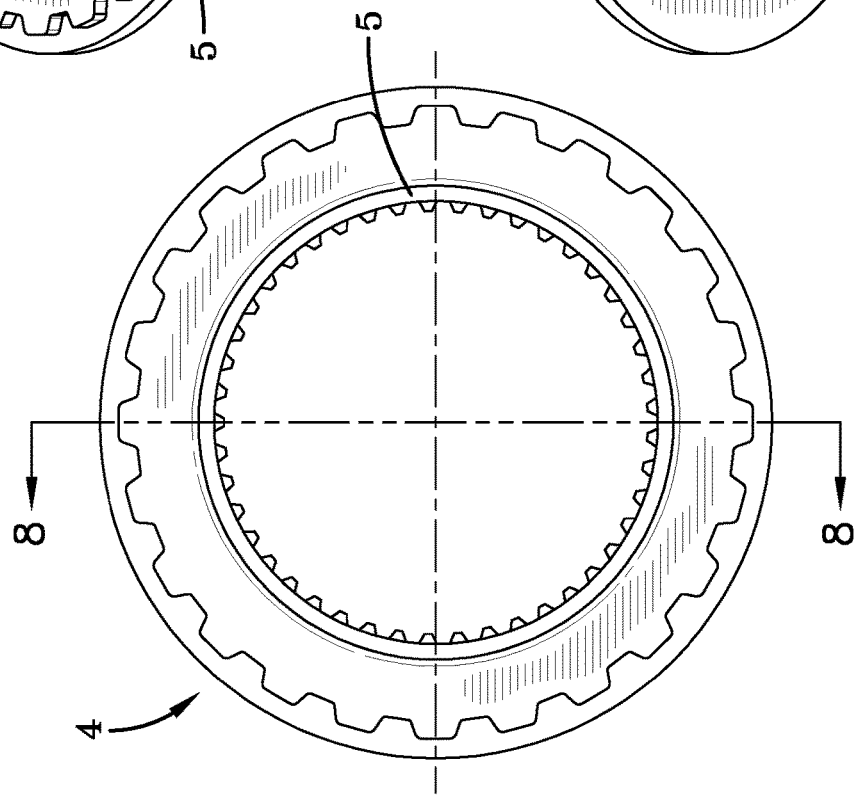
FIG. 7 is a top view of the sintered powdered metal inner splined connection gear shown in FIG. 5.

The toroidal part 1 shown in FIG. 1 is comprised of an external component (the outer race) and an internal component (the inner splined connection gear) which was manufactured in accordance with this invention. FIGS. 2-4 illustrate the outer race 2 having a female ID profile 3. FIGS. 5-8 illustrate the inner splined connection gear 4 having a male connector 5. The outer race 2 is comprised of forged powder metal or a wrought metal and is manufactured utilizing conventional techniques. In many cases, the outer race 2 will be comprised of a wrought metal which is made by being cast into a solid form which is subsequently worked, such as by machining, into a final form. Accordingly, the term "wrought metal" characterizes a full density metal that comes from a molten (liquid) metal rather than being made by powder metal technology. The term "wrought metal" is used to characterize full density metal that comes from molten (liquid) metal in contrast to being made by powder metal technology. Wrought metal components of a part can be easily distinguished from components made by powder technology on the basis of both their micro-hardness and apparent hardness. Additionally, the powder metal components can also be readily distinguished from the wrought metal components by microscopy. In any case, the outer race 2 will be comprised of a forged powder metal or a wrought metal with the inner splined connection gear 4 being comprised of a sintered powder metal.

In manufacturing the parts of this invention the male outside diameter profile of the internal component will be positioned within the female inside diameter profile of the external component with the external component and the internal component being attached together by sinter brazing, laser brazing, laser welding, staking, or sintering a mechanical joint.

The metal powders that can be utilized in manufacturing the high strength toroidal parts of this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together, along with the copper and other additives as desired to attain needed results, such as lubricants and graphite, and molded as a mixture. A second possibility is to use various alloyed powders, such as an iron-nickel-molybdenum-copper steel or iron-chromium-molybdenum-copper steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder, including copper, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used as long metal composition expands during sintering to a greater degree than does the metal utilized in the outer component of the part. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, nickel, silicon, chromium, and, of course, copper.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2$/kg) with hydrogen-reduced sponge iron typically having a surface area of about 200 $m^2$/kg. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the preform for the inner component of the toroidal part being manufactured.

The powder metal preform is then sintered. After being removed from the preform die, the toroidal part is typically placed in a sintering furnace where it is sintered at a temperature which is about 60% to about 90% of the melting point of the metal composition being employed. The sintering temperature will normally be in the range of 1500° F. (816° C.) to 2450° F. (1343° C.). The sintering temperature for the iron based compacts normally utilized in the practice of this invention will more typically be within the range of 2000° F. (1093° C.) to about 2400° F. (1316° C.). The sintering temperature utilized will typically be decreased with increasing levels of copper due to the considerably lower melting point of the copper. In any case, the appropriate sintering temperature and time-at-temperature will depend on several factors, including the chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at 2000° F. to 2450° F. for approximately 30 minutes in a protective atmosphere to sinter the metal.

The sintering temperature is typically within the range of 2000° F. to 2400° F. and may be, for example, 2070° F. for many iron-based preforms. Depending on, for example, the type of powder metal and the desired article, the sintering temperature can vary. After being sintered in the furnace the toroidal part is normally cooled to room temperature.

While certain representative embodiments and details have been shown for the purpose of illustrating the subject invention, it will be apparent to those skilled in this art that various changes and modifications can be made therein without departing from the scope of the subject invention.

What is claimed is:

1. A method of manufacturing a metal part which comprises (1) providing an external component and an internal component, wherein the external component has an external profile which includes a female inside diameter profile, and wherein the internal component has an internal profile which includes a male outside diameter profile, wherein the external component is comprised of a forged powder metal or a wrought metal and wherein the internal component is comprised of a sintered powder; (2) positioning the male outside diameter profile of the internal component within the female inside diameter profile of the external component; and (3) affixing the external component and the internal component together by sinter brazing or laser brazing.

2. The method of claim 1 wherein the external component is comprised of a wrought metal.

3. The method of claim 1 wherein the external component is comprised of a forged powder metal.

4. The method of claim 1 wherein the external component and the internal component are affixed together by sinter brazing.

5. The method of claim 1 wherein the external component and the internal component are affixed together by laser brazing.

6. The method of claim 1 wherein the metal part is a toroidal part, wherein the external component is an outer race, and wherein the internal component is inner splined connection gear.

7. The method of claim 6 wherein the outer race has a female inside diameter profile.

8. The method of claim 1 wherein metal part is an inner splined connection gear.

9. The method of claim 8 wherein the inner splined connection gear has a male connector.

* * * * *